Patented Sept. 9, 1947

2,427,070

UNITED STATES PATENT OFFICE 2,427,070

VULCANIZATION OF VINYL RESIN

Louis F. Reuter, Akron, Ohio, assignor to The B. F. Goodrich Company, New York, N. Y., a corporation of New York No Drawing. Application October 14, 1943,
Serial No. 506,270

14 Claims. (Cl. 260—88)

This invention relates to the vulcanization of vinyl resins, and pertains more specifically to the reduction of the thermoplasticity of plasticized compositions containing polymers made from the halogenated ethylenes.

As is well known, various polymers of the halogenated ethylenes may be plasticized with certain plasticizers to give rubbery plastic products possessing properties which render them valuable as substitutes for rubber. These plastic products also have certain properties which render them superior to natural rubber for many uses. Among the polymers which have been thus employed are those made from vinyl chloride, vinylidene chloride, vinyl bromide, vinylidene bromide, and mixtures of these monomers with one another, as well as with other co-polymerizable monomers, such as vinyl acetate, vinyl propionate, vinyl butyrate, methyl acrylate, methyl methacrylate, ethyl acrylate, methyl ethacrylate and other similar materials. One of the outstanding properties of these plasticized polymeric compositions is that they are permanently thermoplastic, that is, that they may be repeatedly softened by heating to a temperature well above room temperature. Although this property is in many respects advantageous, it is undesirable when the polymer composition is to be employed in structures which are exposed to high temperature in service.

I have now discovered that the thermoplasticity of these polymeric compositions may be greatly reduced or completely eliminated by heating the composition with aldehyde-ammonia reaction products. Because this reduction of thermoplasticity is analogous to the change which occurs in rubber when it is vulcanized, I have termed my process vulcanization. However, by the use of this term, I do not intend to restrict myself to any particular theory as to the mechanism of the process. The vulcanizing agents which I have found to be effective include all of the reaction products of ammonia with short-chain aliphatic aldehydes. By the term "short-chain" is meant those aliphatic aldehydes containing less than about five carbon atoms in the molecule. Among those which may be used are formaldehyde, acetaldehyde, propionaldehyde and butyraldehyde. The reaction between the aldehyde and ammonia may be carried out simply by adding the aldehyde to an aqueous solution of ammonia at room temperature. Of these reaction products I prefer to use the reaction products of ammonia with formaldehyde or acetaldehyde, of which the former is more commonly known under the name hexamethylenetetramine.

The polymers with which my new vulcanizing agents are effective consist of those made by the polymerization of monomeric materials consisting predominantly of a halogenated ethylene, in which from one to two halogen atoms are attached to one only of the carbon atoms. Although as little as 0.5 percent of my new vulcanizing agent, based upon the weight of the polymer, may be effective under the proper conditions, I have found that the best results are obtained by using from about two to about ten per cent or more. The amount and type of plasticizer employed in the composition is not critical, although, of course, the softness and resiliency of the stock depend to a large extent upon the particular plasticizer employed. In general, useful compositions may be secured by using from about 20 to about 150 parts or more of plasticizer for each 100 parts of polymer. Any of the usual plasticizers may be employed such as tricresyl phosphate, dibutyl phthalate, dioctyl phthalate, ditetrahydrofurfuryl sebacate, dicapryl phthalate, butyl phthalyl butyl glycolate, undecyl tetrahydronaphthyl ketone, cyclohexyl o-benzoylbenzoate, or the like.

The vulcanizing agent may be added together with the plasticizer to the polymer either on a hot roll mill or in an internal mixer, or the mixture of vulcanizing agent and plasticizer may be added to an emulsion or solution of the polymer. If desired, the plasticizer may be first incorporated in the polymer and the vulcanizing agent added to the plasticized composition. In order to obtain vulcanization, it is necessary to heat the composition containing the vulcanizing agent to an elevated temperature for a substantial period of time. Although the temperature and time of vulcanization vary with the amount and type of plasticizer employed, as well as with the type of polymer, best results are generally secured by heating the composition to a temperature of at least 300° F., preferably from about 320° to about 350° F. At these temperatures the time required for vulcanization varies from about 10 to about 100 minutes, depending upon the particular ingredients of the composition.

It has been found that the ease of vulcanization of the polymer is directly proportional to the halogen content of the polymer. For example, a polymer of vinylidene chloride is more readily vulcanized than a copolymer of vinyl chloride with vinyl acetate. However, any polymer made by the polymerization of a mixture of monomers containing a predominant amount of either a vinyl halide or a vinylidene halide may be vulcanized with my new agents.

The following examples will serve further to illustrate the nature of my invention:

*Example I*

A plasticized polymer composition was prepared by mixing 100 parts by weight of high molecular weight polyvinyl chloride, 80 parts by weight of butyl phthalyl butyl glycolate, and 10 parts by weight of magnesium oxide on a hot roll mill. To this composition there was added, as vulcanizing agent, five parts of hexamethylenetetramine. After thorough mixing, the composition was vulcanized in a press for 30 minutes at 330° F. A similar composition containing no vulcanizing agent was heated in a press under the same conditions. When cooled, the two products were both resilient, rubbery materials having a high tensile strength. When heated, however, the product containing no vulcanizing agents became progressively softer and more plastic, whereas the vulcanized product retained its resilience and rubbery qualities to a remarkable degree, even at temperatures as high as 150° C. The unvulcanized product could readily be sheeted out on a hot roll mill, whereas the vulcanized product could not be.

*Example II*

To a plasticized polymer composition containing 100 parts by weight of high molecular weight polyvinyl chloride, together with 70 parts of butyl phthalyl butyl glycolate, prepared as in Example I, there were added five parts of the reaction product of acetaldehyde-ammonia. After thorough mixing, the composition was vulcanized in a press for 30 minutes at 330° F. The resultant product was similar to the vulcanized product of Example I, and was much less thermoplastic than a similar composition containing no vulcanizing agent.

Any of the usual pigments, fillers, reinforcing agents, stabilizers, or other materials commonly used in plasticized vinyl resin composition may be employed in my new vulcanizable composition without deleterious effect.

These new vulcanized compositions are useful for not only all the purposes to which the plasticized vinyl resin compositions heretofore known have been put, but they are particularly valuable for their low permanent set, especially at elevated temperatures.

Although I have herein described specific embodiments of my invention, I do not intend to restrict myself solely thereto, but to include all of the modifications embraced within the spirit and scope of the appended claims.

I claim:

1. The method of vulcanizing a plasticized polymer composition having as a base a polymer prepared by the polymerization of a monomeric material consisting predominantly of a halogenated ethylene containing from one to two halogen atoms on one only of the carbon atoms, which comprises incorporating in said plasticized polymer composition from about 0.5 to about 10%, by weight of the polymer, of the reaction product of ammonia with an aliphatic saturated aldehyde having less than five carbon atoms, and heating said composition at a temperature from 300 to 350° F. for 10 to 100 minutes in the absence of sulfur.

2. The method of vulcanizing a plasticized polymer composition having as a base a polymer prepared by the polymerization of a monomeric material consisting predominantly of a halogenated ethylene containing from one to two halogen atoms on one only of the carbon atoms, which comprises incorporating in said plasticized polymer composition from about 0.5 to about 10%, by weight of the polymer, of hexamethylene tetramine, and heating said composition at a temperature from 300 to 350° F. for 10 to 100 minutes in the absence of sulfur.

3. The method of vulcanizing a plasticized polymer composition having as a base a polymer prepared by the polymerization of a monomeric material consisting predominantly of a halogenated ethylene containing from one to two halogen atoms on one only of the carbon atoms, which comprises incorporating in said plasticized polymer composition from about 0.5 to about 10%, by weight of the polymer, of acetaldehyde-ammonia, and heating said composition at a temperature from 300 to 350° F. for 10 to 100 minutes in the absence of sulfur.

4. The method of vulcanizing a plasticized polymer composition having as a base a polymer prepared by the polymerization of a monomeric material consisting of a halogenated ethylene containing from one to two halogen atoms on one only of the carbon atoms, which comprises incorporating in said plasticized polymer composition from about 0.5 to about 10%, by weight of the polymer, of hexamethylene-tetramine and heating said composition at a temperature from 300 to 350° F. for 10 to 100 minutes in the absence of sulfur.

5. The method of vulcanizing a plasticized polymer composition having as a base a polymer prepared by the polymerization of a monomeric material consisting of a halogenated ethylene containing from one to two halogen atoms on one only of the carbon atoms, which comprises incorporating in said plasticized polymer composition from about 0.5 to about 10%, by weight of the polymer, of acetaldehyde-ammonia, and heating said composition at a temperature from 300 to 350° F. for 10 to 100 minutes in the absence of sulfur.

6. The method of vulcanizing a plasticized polymer composition having as a base polyvinyl chloride, which comprises incorporating in said plasticized polymer composition from about 0.5 to about 10%, by weight of the polymer, of hexamethylenetetramine, and heating said composition at a temperature from 300 to 350° F. for 10 to 100 minutes in the absence of sulfur.

7. The method of vulcanizing a plasticized polymer composition having as a base polyvinyl chloride, which comprises incorporating in said plasticized polymer composition from about 0.5 to about 10%, by weight of the polymer, of acetaldehyde-ammonia and heating said composition at a temperature from 300 to 350° F. for 10 to 100 minutes in the absence of sulfur.

8. A vulcanized composition prepared by the method of claim 1.

9. A vulcanized composition prepared by the method of claim 2.

10. A vulcanized composition prepared by the method of claim 3.

11. A vulcanized composition prepared by the method of claim 4.

12. A vulcanized composition prepared by the method of claim 5.

13. A vulcanized composition prepared by the method of claim 6.

14. A vulcanized composition prepared by the method of claim 7.

LOUIS F. REUTER.

REFERENCES CITED

The following references are of record in the file of this patent:

UNITED STATES PATENTS

| Number | Name | Date |
| --- | --- | --- |
| 2,013,941 | Young et al. | Sept. 10, 1935 |
| 2,205,654 | Ida et al. | June 25, 1940 |
| 2,117,591 | Alexander | May 17, 1938 |
| 2,148,831 | Raynolds | Feb. 28, 1939 |